May 1, 1956  D. R. McKUNE  2,743,807
UNSCRAMBLER CONSTRUCTION
Filed Dec. 27, 1949
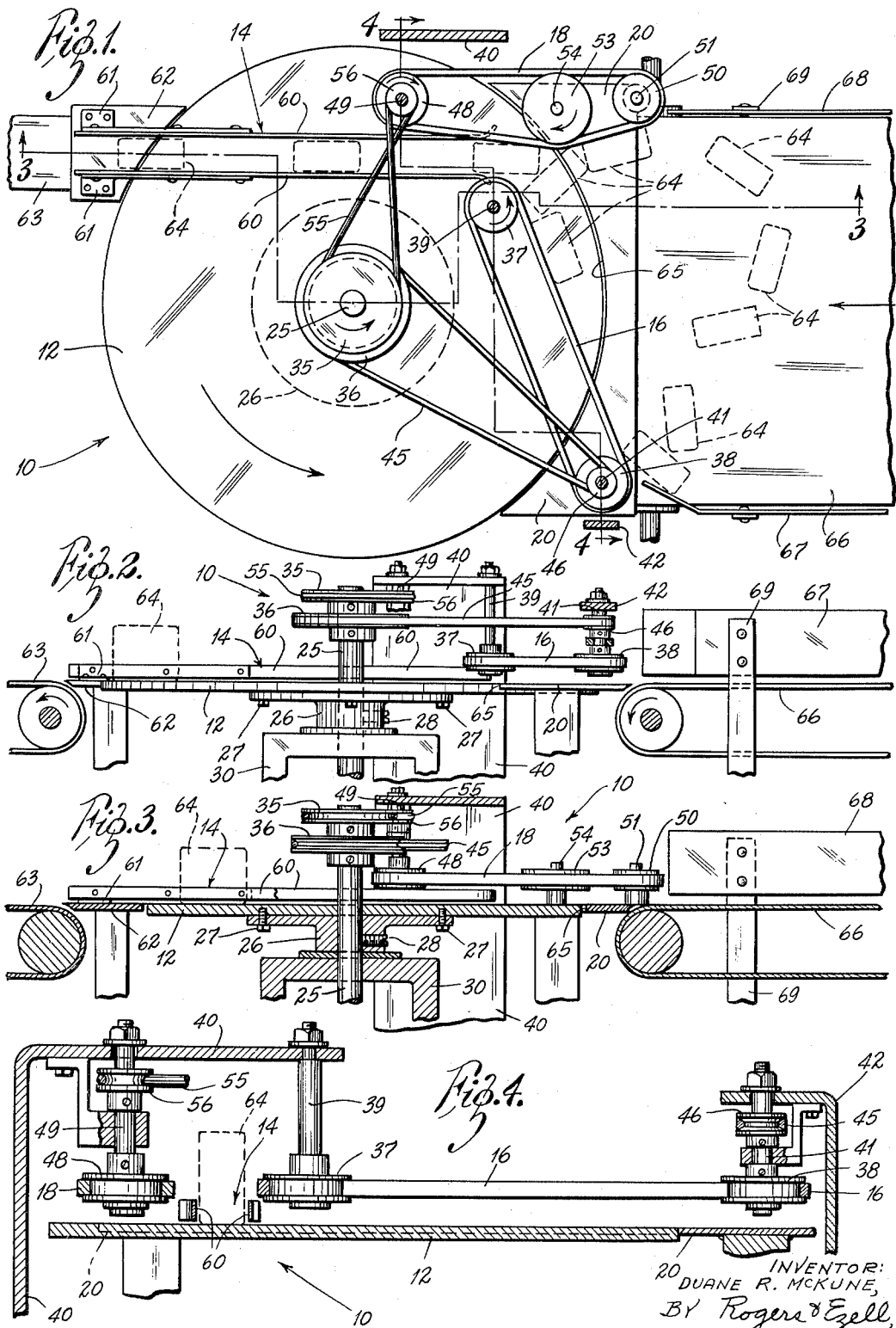
INVENTOR:
DUANE R. McKUNE,
BY Rogers & Ezell
ATTORNEYS.

United States Patent Office 2,743,807
Patented May 1, 1956

2,743,807

UNSCRAMBLER CONSTRUCTION

Duane R. McKune, Dunedin, Fla., assignor, by mesne assignments, to Minute Maid Corporation, New York, N. Y., a corporation of Florida Application December 27, 1949, Serial No. 135,186

5 Claims. (Cl. 198—30)

The present invention relates generally to unscrambler constructions, and more particularly to an unscrambler construction for receiving masses of cans of any shape and for directing them toward and into a receiving guide in single file and onto a belt conveyor or other receiver.

In brief, the present unscrambler construction includes a driven disc adjacent an edge portion of which is a transition dead plate adapted to initially receive cans in masses or otherwise. Projecting across the transition dead plate and a portion of the disc is a can turning belt, one side of which biases cans toward the opening of spaced can discharge guide members. A can guide belt is spaced from the end of the can turning belt adjacent the entrance of the can discharge guide members in position to cooperate with the can turning belt and the disc to direct cans of any shape into said entrance in single file. The can turning belt travels at a speed approximately twenty-five percent faster than that of the can guide belt. Hence, cans are subjected to the rotational effect of the disc and to the movement of either or both of the can turning belt and the can guide belt to feed cans in single file between the can discharge guides.

Therefore, an object of the present invention is to provide a novel can unscrambler construction which is adapted to receive masses of cans of any configuration and to dispose them in single file between can discharge guides.

Another object is to provide a novel can unscrambler device which is fully automatic in its operation of receiving masses of cans of any configuration and disposing them in single file between can discharge guides.

Another object is to provide a novel unscrambler construction for cans which is adapted to function efficiently to perform its unscrambling function in connection with cans of any cross section which are in anywise adapted to be unscrambled and disposed in a single line.

Another object is to provide a novel unscrambler construction for disposing can masses in a single file which is of simplified construction, thereby reducing to a minimum shutdown of the device and maintenance.

Other objects are to provide a novel unscrambler construction for disposing cans of various cross sections and the like in single file which is relatively inexpensive, which reduces to a minimum moving parts without sacrifice of efficiency or capacity, which may be successfully operated at various speeds, which is economical to operate, which reduces to a minimum manual supervision, and which is otherwise adapted to fulfill the objects and advantages sought therefor.

The foregoing and other objects and advantages are apparent from the following description taken with the accompanying drawing, in which:

Fig. 1 is a plan view of an unscrambler construction incorporating the teachings of the present invention, a feeder belt for the construction and a discharge belt being broken away for conservation of space;

Fig. 2 is a side elevational view thereof, the support being broken away as immaterial to the present disclosure;

Fig. 3 is a vertical longitudinal cross-sectional view on substantially the line 3—3 of Fig. 1; and Fig. 4 is a vertical transverse cross-sectional view on substantially the line 4—4 of Fig. 1.

Referring to the drawing more particularly by reference numerals, 10 indicates generally an unscrambler construction built in accordance with the teachings of the present invention. Broadly, the present unscrambler construction 10 includes a constantly rotating disc 12 of relatively large size, a can discharge guide 14 extending across the upper face of the disc 12 and adapted to receive cans or the like in single file for discharge to a conveyor or the like, a constantly driven can turning belt 16 which extends out across the upper face of the disc 12, a continuously driven can guiding belt 18 which also extends out over the upper face of the disc 12 in spaced relation to the belt 16, a transition dead plate 20 having its upper face at the same elevation as that of the disc 12 and disposed adjacent a portion of the periphery thereof, and interconnecting and associated elements.

The disc 12 is of relatively large diameter and is secured to a vertical driven shaft 25 for rotation thereby through the medium of a collar 26 secured to the underside of the disc 12 by suitable screws 27 and to the shaft 25 by a set-screw 28. The shaft 25 is mounted in a pedestal 30, or the like, for rotation, and it is understood that the shaft 25 is driven by an electric rotor, or the like, through any type of selected gearing. Operating speeds of from 10 to 40 R. P. M. have been employed, the selected speed depending upon factors such as the size and weight of the cans or the like being unscrambled. The particular power and support for the driven shaft 25 is immaterial to the present invention.

Adjacent sheaves or pulleys 35 and 36 are secured to the upper end of the driven shaft 25 by suitable setscrews, the former being of smaller diameter than the latter.

The can turning belt 16 is trained about spaced pulleys 37 and 38, the former being freely rotatably mounted on the lower end of a fixed stub shaft 39 depending from the horizontal portion of a bracket 40, and the latter being secured to the lower end of a depending stub shaft 41 for rotation therewith which is rotatably suspended from the horizontal portion of a bracket 42. The brackets 40 and 42 are supported by any form of suitable table or base selected for mounting the present construction. It is to be observed that the pulley 37 is suspended in a position so that the can turning belt 16 extends across a portion of the disc 12.

The can turning belt 16 is driven by a belt 45, one end of which is trained around the pulley 36 mounted on the shaft 25 and the other end of which is trained around a small pulley 46 secured to the shaft 41 above the pulley 38.

The can guide belt 18 has one end trained around a pulley 48 secured by a setscrew to the lower end of a depending stub shaft 49 which is rotatably supported from the horizontal portion of the bracket 40 through the medium of a suitable bearing. The other end of the can drive belt 18 is trained around a pulley 50 freely rotatable on a fixed stub shaft 51 supported by the transition dead plate 20. Contacting the belt 18 intermediate its ends is a pulley 53 of larger diameter than the pulleys 48 and 50 which is mounted on a stub shaft 54 supported by the transition dead plate 20. It is to be observed that the pulley 48 is suspended over the disc 12 and in spaced relation to the pulley 37 about which one end of the belt 16 is trained.

A belt 55 is provided for driving the belt 18 and has one end trained around the pulley 35 and the other end trained around a small pulley 56 secured by a setscrew to the stub shaft 49 at a point above the pulley 48. Manifestly, the power for driving both the belt 16 and the belt 18 derives from the driven shaft 25. In a preferred arrangement, the speed of the belt 18 is substantially the same as the speed of the periphery of the disc 12.

The can discharge guide construction 14 includes spaced parallel fence elements 60 which extend out across the disc 12 and are secured to arms of brackets 61 mounted upon a support 62 disposed beside the disc 12. Adjacent the support 62 is a belt conveyor 63 adapted to receive cans 64, or the like, from the discharge guide construction 14. The free ends of the fence elements 60 are flared in order to readily receive cans 64 or the like. The mouth defined by the fence elements 60 is disposed at what may be termed a confluence of the joint effect of the belts 16 and 18 and the disc 12.

The transition dead plate 20 includes a convex edge 65 disposed adjacent a portion of the periphery of the disc 12 and a straight edge disposed adjacent the discharge point of a belt conveyor 66 which receives the cans 64 or the like in a mass from a package or other source. Guide plates 67 and 68 are disposed alongside the belt conveyor 66 which are supported by posts 69.

Operation

When the present unscrambler construction 10 is in operation, power for rotating the disc 12 and for driving the can turning belt 16 and the can guide belt 18 comes from the driven shaft 25. Adjustments of the relative speeds of the belts 16 and 18 to the disc 12 and to each other may be readily achieved by replacing any one or more of the several pulleys by other pulleys.

It is to be observed that the two belts 16 and 18 and the disc 12 combine in their movements to direct cans 64, or the like, of any selected cross section toward the receiving mouth of the can discharge guide construction 14. The conveyor belt 66, of course, continuously urges the cans 64, or the like, onto the transition dead plate 20 and onto the disc 12 and against the belts 16 and 18. Normally, the speed of the can turning belt 16 is about 25% greater than the speed of the can guide belt 18. Hence, a can 64, or the like, attempting to choke up the space between the belts 16 and 18 will be quickly and efficiently moved into the mouth of the can discharge guide construction 14 through the faster movement of the belt 16. The combined effect of the belts 16 and 18 and the disc 12 is particularly effective upon oblong or square cans, or the like, with which standard types of unscrambler constructions find difficulty. The movement of the disc 12 insures feeding of the cans 64, or the like, into the mouth of the can discharge construction 14 so that it is not necessary to rely upon the pressure of can masses being supplied by the conveyor belt 66 against the belts 16 and 18. The rotation of the disc 12 also moves cans 64, or the like, along between the can discharge guide fence elements 60.

It is manifest that there has been provided an unscrambler construction which fulfills the objects and advantages sought therefor.

It is to be understood that the foregoing description and the accompanying drawing have been given by way of illustration and example. It is also to be understood that changes in form of the elements, rearrangement of parts, and substitution of equivalent elements, which will be obvious to those skilled in the art, are contemplated as within the scope of the present invention which is limited only by the claims which follow.

What is claimed is:

1. Unscrambler construction comprising, in combination, a relatively large rotatably mounted disc, a first driven belt having a can engaging run extending across a portion of said disc, a second driven belt having a can engaging run extending across a portion of said disc, said can engaging runs being disposed at no less than 45° relation to each other and spaced apart at the closest points of approach to provide a can passage, said passage being over said disc, and a pair of opposed fence elements extending across a portion of said disc terminating at said can passage and adapted to receive cans one at a time at said can passage and to guide received cans in single file to discharge, the can influencing movements of said disc and said two can engaging runs being directionally convergent at different speeds toward said can passage.

2. Unscrambler construction for unscrambling upstanding cans having a rectangular plan form of greater length than width comprising, in combination, fixed means defining an elongated channel for receiving rectangular cans in narrow single file order for discharge, horizontally rotatable means for positively moving received cans through said channel to discharge, a plurality of convergingly movable means cooperative with said rotatable means to receive can masses and to rotate individual cans about their respective vertical axes as necessary ultimately to move the cans into narrow single file order in said channel, each of said convergingly movable means having a directional component of movement which is in the direction of desired movement of the cans through the elongated channel, and means for continuously driving said plurality of convergingly movable means from said rotatable means.

3. Unscrambler construction for unscrambling upstanding cans having a rectangular plan form of greater length than width comprising, in combination, a horizontal disc mounted for rotation about a vertical axis, means for slidingly advancing rectangular cans onto said disc for subsequent delivery therefrom in longitudinal single file order, fixed guide means disposed above said disc for receiving cans in desired longitudinal orientation in respect to one another and guiding them to delivery in single file order, and a plurality of deflecting means disposed above said disc for rotatively orienting the cans and at the same time directing them into said guide means, each of said deflecting means being effective to urge cans only in the general direction of desired advancement of the cans through said guide means.

4. The combination of claim 3 wherein the can engaging elements comprise adjacent runs of endless belts, said runs being disposed at no less than 45° to each other for converging movement toward said guide means.

5. The combination of claim 4 with means for driving the endless belts at different linear speeds.

References Cited in the file of this patent

UNITED STATES PATENTS

| | | |
|---|---|---|
| 1,990,549 | Kimball | Feb. 12, 1935 |
| 2,047,106 | Lidberg | July 7, 1936 |
| 2,187,101 | Schneider | Jan. 16, 1940 |
| 2,373,600 | Richey | Apr. 10, 1945 |
| 2,389,496 | Gagnon | Nov. 20, 1945 |
| 2,389,696 | Stiles | Nov. 27, 1945 |
| 2,541,300 | Silva | Feb. 13, 1951 |
| 2,560,995 | Stiles | July 17, 1951 |

FOREIGN PATENTS

| | | |
|---|---|---|
| 109,097 | Australia | Nov. 23, 1939 |